United States Patent
Behmenburg et al.

(10) Patent No.: US 6,685,174 B2
(45) Date of Patent: Feb. 3, 2004

(54) CLOSED LEVEL CONTROL SYSTEM FOR A VEHICLE

(75) Inventors: Christof Behmenburg, Lauenau (DE); Helge Westerkamp, Hannover (DE)

(73) Assignee: Continental Aktiengesellschaft, Hannover (DE)

( * ) Notice: Subject to any disclaimer, the term of this patent is extended or adjusted under 35 U.S.C. 154(b) by 218 days.

(21) Appl. No.: 09/733,046

(22) Filed: Dec. 11, 2000

(65) Prior Publication Data

US 2001/0004443 A1 Jun. 21, 2001

(30) Foreign Application Priority Data

Dec. 10, 1999 (DE) .......................... 199 59 556

(51) Int. Cl.[7] .................. F16F 9/43; B60G 11/26
(52) U.S. Cl. ................ 267/64.28; 280/5.514; 280/124.16
(58) Field of Search .................. 280/124.104, 124.106, 280/124.157, 124.16, 5.514, 124.158, 124.159, 124.161; 267/64.28, 64.16

(56) References Cited

U.S. PATENT DOCUMENTS

| | | | |
|---|---|---|---|
| 4,659,104 A | * 4/1987 | Tanaka et al. | ........... 280/6.158 |
| 4,695,074 A | 9/1987 | Kobayashi et al. | |
| 4,834,418 A | * 5/1989 | Buma et al. | ........... 280/124.106 |
| 4,852,906 A | * 8/1989 | Buma et al. | ........... 280/5.507 |
| 4,856,798 A | * 8/1989 | Buma et al. | ........... 280/5.507 |
| 4,858,895 A | * 8/1989 | Buma et al. | ........... 267/64.16 |
| 4,965,878 A | * 10/1990 | Yamagiwa et al. | ........... 280/5.514 |
| 5,322,321 A | * 6/1994 | Yopp | ........... 280/6.158 |
| 5,452,919 A | 9/1995 | Hoyle et al. | |

FOREIGN PATENT DOCUMENTS

| | | |
|---|---|---|
| DE | 33 39 080 | 5/1985 |
| JP | 55 136611 | 10/1980 |
| JP | 56 018137 | 2/1981 |
| JP | 62 074704 | 4/1987 |
| JP | 01 218911 | 9/1989 |

* cited by examiner

Primary Examiner—Jack Lavinder
Assistant Examiner—Robert A. Siconolfi
(74) Attorney, Agent, or Firm—Walter Ottesen

(57) ABSTRACT

The invention relates to a closed level control system for a vehicle. The closed level control system includes a pump which transfers a pressurized medium between a pressurized medium supply vessel (4) and pressurized medium chambers (2a to 2d). The input (8) of the pump (6) is connected to the supply vessel (4) and the output (10) of the pump (6) is connected to the pressurized medium chambers (2a to 2d) when the pressurized medium is to be pumped from the supply vessel (4) into the pressurized medium chambers (2a to 2d). If, in contrast, pressurized air is to be pumped from a pressurized medium chamber (2a to 2d) into the supply vessel (4), then the input (8) of the pump (6) is connected to the pressurized medium chamber and the output (10) of the pump (6) is connected to the supply vessel (4). The above-mentioned connections preferably take place via controllable directional valves (14, 18). The level control system makes it possible that the pump (6) has to always run only in one direction.

8 Claims, 2 Drawing Sheets

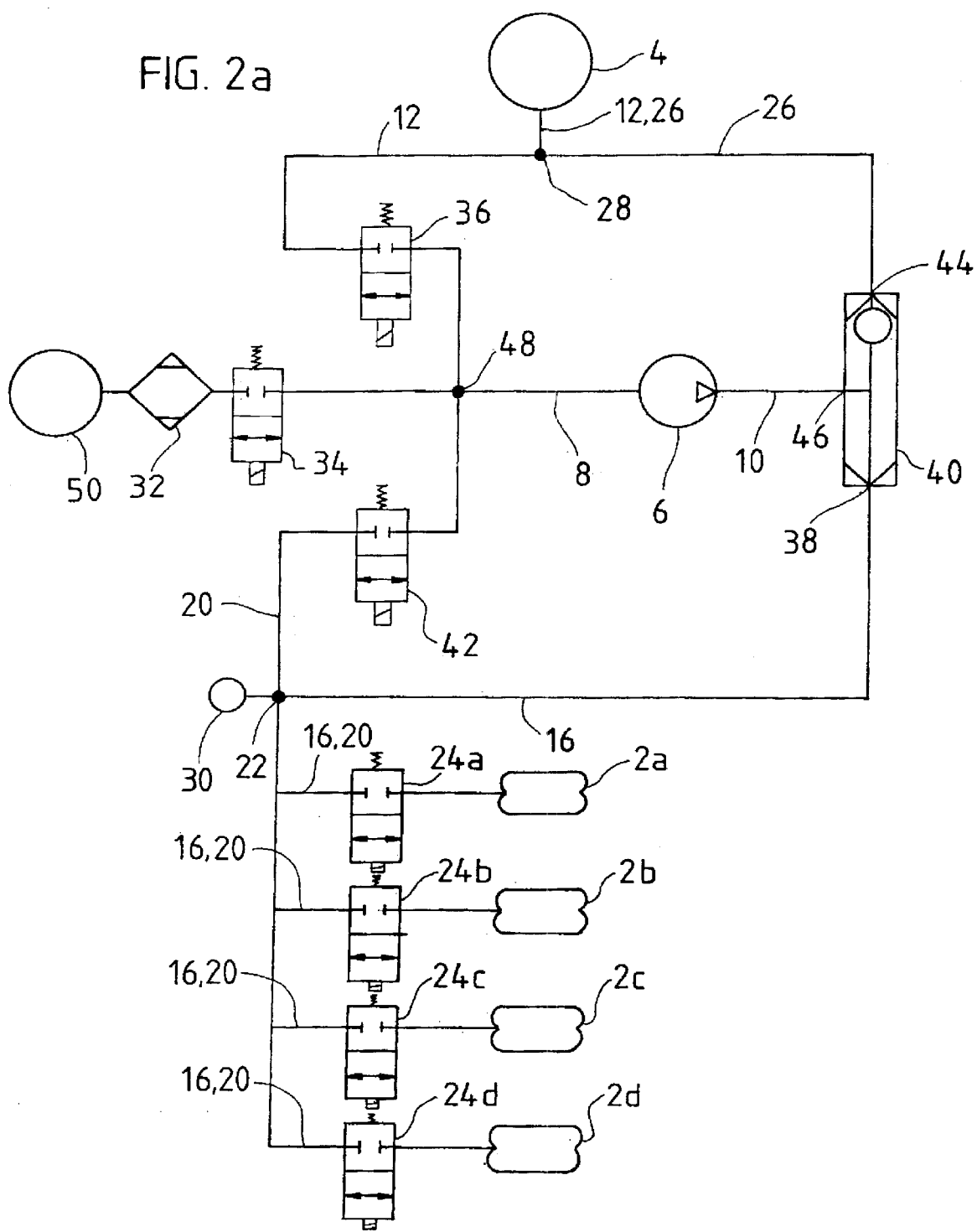

CLOSED LEVEL CONTROL SYSTEM FOR A VEHICLE

FIELD OF THE INVENTION

The invention relates to a closed level control system for a vehicle having pressurized medium chambers via which a vehicle body is suspended relative to at least one vehicle axle. The closed level control system includes: a supply vessel containing a pressurized medium; at least one pressurized medium chamber, which is operatively connected to the pressurized medium supply vessel in such a manner that the pressurized medium can be transferred from the pressurized medium supply vessel into the pressurized medium chamber or pressurized medium from the pressurized medium chamber can be transferred into the pressurized medium supply vessel; and, a pump with which a pressurized medium can be transferred from the pressurized medium chamber into the pressurized medium supply vessel or vice versa.

BACKGROUND OF THE INVENTION

A level control system of this kind incorporating an air spring arrangement is disclosed in German patent publication 3,339,080. The air spring arrangement described in this publication affords the advantage that only one pressurized air supply vessel is required into which air is pumped from the air springs with the aid of a pump or air is pumped from the pressurized air supply vessel into the air springs. The air spring arrangement is, however, so built up that the pump must pump in two directions and this causes the pump to have a complex configuration.

SUMMARY OF THE INVENTION

It is an object of the invention to provide a closed level control system which has a simple configuration and can be driven by a pump which can pump the pressurized medium only in one direction.

The closed level control system of the invention is for a vehicle having a vehicle body, vehicle axles and pressurized medium chambers with which the vehicle body is suspended relative to corresponding ones of the vehicle axles. The closed level control system includes: a pressurized medium supply vessel for holding a medium under pressure as a pressurized medium; a pump for transferring the pressurized medium between the supply vessel and the pressurized medium chambers; the pump having an input and an output and the pump being configured so as to permit the pump to pump the pressurized medium from the input to the output thereof; a first controllable directional valve; a second controllable directional valve; a first pressurized medium line connected to the supply vessel and being connected via the first controllable directional valve to the input of the pump; a second pressurized medium line connected to the pressurized medium chambers and being connected via the second controllable directional valve to the output of the pump at least when the pressurized medium is to be transferred from the supply vessel into the pressurized medium chambers; a third pressurized medium line connected to the pressurized medium chambers and being connected via the first controllable directional valve to the input of the pump; and, a fourth pressurized medium line connected to the supply vessel and being connected via the second controllable directional valve to the output of the pump at least when pressurized medium is to be transferred by the pump from the pressurized medium chambers into the supply vessel.

The basic idea of the invention is that when a pressurized medium is to be pumped from the pressurized medium supply vessel into a pressurized medium chamber, then the input of the pump is connected to the pressurized medium supply vessel and the output of the pump is connected to the pressurized medium chamber. If, in contrast, pressurized air is to be pumped from a pressurized medium chamber into the pressurized medium supply vessel, then the input of the pump is connected to the pressurized medium chamber and the output of the pump is connected to the pressurized medium supply vessel.

The advantage achieved with the invention is especially seen in that the air is always pumped from the input to the output of the pump independently of whether the air is pumped from the pressurized medium supply vessel into a pressurized medium chamber or in the opposite direction. In this way, the pump only has to pump in one direction and therefore can be configured in a simple manner. A further advantage of the invention is that only few directional valves, which incur cost, are needed in the level control system.

According to another feature of the invention, the level control system includes two controllable directional valves via which the pressurized medium lines are connected. One of the controllable directional valves is arranged at the input and the other controllable valve is arranged at the output of the pump. The advantage of this embodiment is that the number of controllable directional valves, and therefore the cost thereof, is held as low as possible.

According to another feature of the invention, the level control system includes two controllable directional valves and a changeover valve. The pressurized medium lines are connected to the input of the pump from time to time and are conducted via at least one of the first and second controllable directional valves to the input of the pump and the pressurized medium lines, which are from time to time connected to the output of the pump, are conducted to different inputs of the changeover valve which is located at the output of the pump.

According to another feature of the invention, the pressurized medium line, which extends from the pressurized medium supply vessel and can be connected to the input of the pump, is connected directly to the pressurized medium line, which extends from the pressurized medium chamber and can be connected to the input of the pump, when both controllable directional valves are simultaneously in the switched state. The advantage of this embodiment is that the air can be conducted directly (that is, without that the air is conducted through the pump) from the pressurized medium supply vessel into the pressurized medium chamber when the pressure of the pressurized medium in the pressurized medium supply vessel is greater than in the pressure chamber. The same applies for the opposite direction.

According to still another embodiment of the invention, the input of the pump is connected via a controllable valve to an external pressurized medium reservoir (that is, not to a reservoir belonging to the level control system) and a pressurized medium line, which extends from the pressurized medium supply vessel, is connected to the output of the pump when the pressurized medium supply vessel is filled up from the external pressurized medium reservoir by means of the pump. The advantage of this embodiment is that the losses of pressurized medium in the pressurized medium supply vessel (for example, because of leakage) can be compensated in that pressurized medium from the pressurized medium reservoir is pumped into the pressurized medium supply vessel with the aid of the pump. Here too, the pump pumps from the input to the output.

According to another feature of the invention, the level control system includes a pressure sensor which is mounted in one of the pressurized medium lines leading away from the pressurized medium chamber. A controllable directional valve is located between the pressurized medium chamber and the pressure sensor and, in a first switching state, the directional valve separates the pressurized medium chamber from the pressure sensor and, in a second switching state, the directional valve connects the pressurized medium chamber to the pressure sensor. The advantage of this embodiment is that, with the aid of the pressure sensor, the pressure in the pressurized medium supply vessel as well as the pressure in the pressurized medium chambers can be measured. How this is done in detail will be explained in connection with the description of the drawings hereinafter. The measured pressure values can be applied to evaluate whether, when pumping the pressurized medium from the pressurized medium supply vessel into the pressurized chamber or vice versa, the pump needs to pump. This is necessary when there is no pressure drop in the desired flow direction of the pressurized medium.

According to still another embodiment of the invention, the controllable directional valves are configured as electrically controllable directional valves. The advantage of this embodiment is that electrical controllable directional valves are commercially available as cost-effective standard components.

BRIEF DESCRIPTION OF THE DRAWINGS

The invention will now be described with reference to the drawings wherein:

FIG. 1 is a schematic of a closed level control system according to an embodiment of the invention;

FIG. 2 is a schematic of a closed level control system according to another embodiment of the invention; and, FIG. 2a is a schematic showing the closed level control system of FIG. 2 supplemented by an external pressurized medium reservoir.

DESCRIPTION OF THE PREFERRED EMBODIMENTS OF THE INVENTION

Figure 1A:
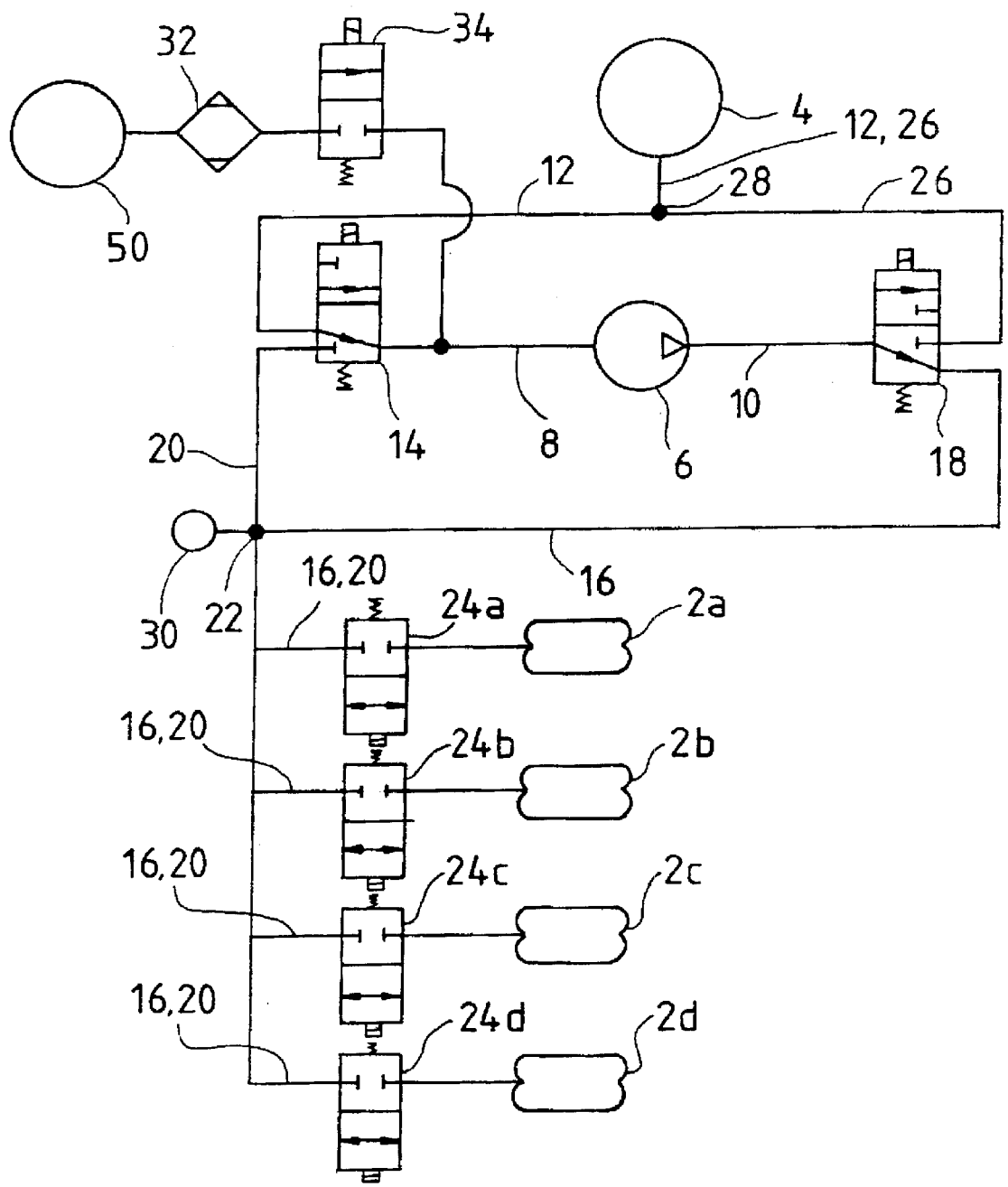
FIG. 1a is a schematic showing the closed level control system of FIG. 1 supplemented by an external pressurized medium reservoir.

FIG. 1 shows a closed level control system in the form of an air spring arrangement for a motor vehicle. The air spring arrangement includes pressurized medium chambers in the form of air springs 2a to 2d. Furthermore, the air spring arrangement includes a pressurized medium supply vessel in the form of a pressurized air vessel 4. The air spring arrangement also includes a pump in the form of a compressor 6 which can pump at least pressurized air from its input 8 to its output 10. A first pressurized air line 12 extends out from the pressurized air vessel 4 and can be connected via a first electrically drivable 3/2 directional valve 14 to the input 8 of the compressor 6. In this case, the 3/2 directional valve 14 is in its first switching state as shown in FIG. 1. A second pressurized air line 16 extends from the air springs 2a to 2d and can be connected to the output 10 of the compressor 6 via a second electrically controllable 3/2 directional valve 18. In this case, the second controllable 3/2 directional valve 18 assumes its switching state as shown in FIG. 1.

A third pressurized medium line 20 extends from the air springs 2a to 2d and can be connected to the input 8 of the compressor 6 via the first electrically drivable directional valve 14. The directional valve 14 is then in its second switching state. The second pressurized air line 16 and the third pressurized air line 20 are preferably connected at point 22 and are conducted from there in common via controllable 2/2 directional valves 24a to 24d to each of the air springs 2a to 2d.

A fourth pressurized air line 26 extends from pressurized air vessel 4 and can be connected to the output 10 of the compressor 6 via the second electrically drivable directional valve 18 which is then in its second switching state. The first pressurized air line 12 and the fourth pressurized air line 26 are preferably connected to each other at point 28 and are from there conducted in common to the pressurized air vessel 4.

In the following, it will be explained how air from the pressurized air vessel 4 can be pumped by means of the compressor 6 into the air spring 2a. For this purpose, the first electrically controllable directional valve 14 and the second controllable directional valve 18 are left in the first switching state shown in FIG. 1 or are transferred into this switching state in that current is applied to their respective control inputs. Furthermore, current is applied to the control input of the electrically controllable directional valve 24a so that this directional valve transfers from the base state shown in FIG. 1 into the switched state. The first pressurized air line 12 is then connected to the input 8 and the second pressurized air line 16 is connected to the output 10 of the compressor 6. On the other hand, the first pressurized air line 12 is connected to the pressurized air vessel 4 and the second pressurized air line 16 is connected to the air spring 2a. Finally, the compressor 6 is driven by an electrical signal so that the compressor pumps air from the input 8 to the output 10 and thereby from the pressurized air vessel 4 into the air spring 2a. If the pumping operation is to be ended, then the compressor 6 is, in turn, driven so that it stops to pump. Furthermore, the electrical control input of the controllable directional valve is no longer supplied with current so that this valve transfers from its switched state again into the base state shown in FIG. 1. Supplying current to the control inputs of the directional valve and the output of the signals to the compressor take place via the control unit (not shown) of the air spring arrangement. This applies also for the following example.

As explained above, pressurized air can be pumped from the pressurized air vessel 4 into the air springs 2b to 2d and, in lieu of directional valve 24a, only the corresponding directional valves 24b to 24d are then to be switched.

In the following, it will be explained how, with the aid of the compressor 6, pressurized air can be pumped from the air spring 2a into the pressurized air vessel 4. First, the first and second electrically controllable directional valves 14 and 18 are transferred from the first switching state shown in FIG. 1 into the second switching state by applying current to the control input. Furthermore, by applying current to the control input of the controllable directional valve 24a, the latter is transferred from the base position shown in FIG. 1 into the switched state. In this case, the third pressurized air line 20 is, on the one hand, connected to the input 8 of the compressor 6 and, on the other hand, the third pressurized air line 20 is connected to the air spring 2a. Furthermore, the fourth pressurized line 26 is, on the one hand, connected to the output 10 of the compressor 6 and, on the other hand, the fourth pressurized air line 26 is connected to the pressurized air vessel 4. When the above connections are established, then a control signal is applied to the compressor 6 so that the compressor starts to pump pressurized air from the input 8 to the output 10 and therefore from the air spring 2a into the pressurized air vessel 4. If no pressurized air is to be discharged anymore from the air spring 2a (that is, pumped into the pressurized air vessel 4), then the compressor 6 is, in turn, driven so that it stops and pumps no more pressurized air. Finally, the electrical control input of the controllable directional valve 24a is no longer supplied with current so that this valve again transfers into the base state shown in FIG. 1.

As explained above, pressurized air can also be discharged from the air springs 2b to 2d into the pressurized air vessel 4. Then, in lieu of directional valve 24a, only the corresponding valves 24b to 24d are to be switched.

In addition to the components referred to above, the air spring arrangement can also include a pressure sensor 30 with which the air pressure can be measured at point 22 at which the second and third pressurized air lines 16 and 20 are connected together. First, it will be explained how the pressure in the pressurized air vessel 4 can be measured with the aid of the pressure sensor 30. For this purpose, the first electrically controllable directional valve 14 and the second electrically controllable directional valve 18 first assume the first switching state shown in FIG. 1.

Furthermore, the electrically controllable directional valves 24a to 24d assume the base state shown in FIG. 1. The pressurized air vessel 4 is then connected via the first pressurized air line 12 and via the second pressurized air line 16 to the point 22 so that then a pressure compensation between the pressurized air vessel 4 and the point 22 takes place when the pressure in the pressurized air vessel 4 is greater than at point 22. Thereafter, the controllable directional valves 14 and 18 are transferred into the second switching state.

The point 22 is then connected via the third pressurized air line 20 and via the fourth pressurized air line 26 to the pressurized air vessel 4 so that then a pressure compensation takes place between the pressurized air vessel 4 and the point 22 when the pressure in the pressurized air vessel 4 is less than at point 22. When the directional valves 14 and 18 are switched by the control unit in advance of the pressure measurement, then the static air pressure in the pressurized supply vessel 4 is present at point 22 and can thereby be measured by the pressure sensor 30. A measurement of the air pressure in the pressurized air vessel 4 can take place at regular intervals and the measured air pressure can be stored in the control unit of the air spring arrangement.

In the following, it will be explained how, with the aid of the pressure sensor 30, the air pressure can be measured in one of the air springs 2a to 2d which is shown here by way of example with respect to air spring 2a. First, the second electrically controllable directional valve 18 is transferred from the first switching state, which is shown in FIG. 1, into its second switching state. In this case, the second pressurized air line 16 ends at a dead end of the second controllable directional valve 18 and the third pressurized air line 20 ends at a dead end of the first controllable directional valve 14. Thereafter, the controllable directional valve 24a is transferred from the base state, which is shown in FIG. 1, into the switching state so that then the static pressure of the air spring 2a is present at point 22 and can be measured with the aid of the pressure sensor 30.

If air is to be pumped from the pressurized air vessel 4 into one of the air springs 2a to 2d or in the opposite direction, then this can take place independently of the pressure relationships, as explained above, with the compressor 6 running. This affords the advantage that the pressure sensor 30 becomes unnecessary. Alternatively, it is possible to compare the air pressure, which is measured in the pressurized air vessel 4, with the air pressure measured directly in advance of the filling operation in the air springs 2a to 2d and to let the compressor 6 only run during filling of the air springs 2a to 2d when the air pressure in the air spring 2a to 2d is less than in the pressurized air vessel 4. The same procedure can be followed when the air pressure is to be pumped from one of the air springs 2a to 2d into the pressurized air vessel 4. This affords the advantage that the compressor only runs when it is necessary.

In addition to the components mentioned up to now, the air spring arrangement includes an air dryer 32 which, on the one hand, can be connected to the atmosphere (external pressurized medium reservoir) and, on the other hand, to the input 8 of the compressor 6 via an electrically controllable directional valve 34. The directional valve 34 is usually in the base state shown in FIG. 1 so that the connection of the air dryer 32 to the input 8 of the compressor 6 is interrupted. With the aid of the compressor 6, air from the atmosphere can be pumped into the pressurized air vessel 4 as follows. First, current is applied to the control inputs of the electrically controllable directional valves 34 and 18 so that they transfer from the states shown in FIG. 1 into their other switching states, respectively. In this case, the input of the compressor 6 is connected via the air dryer 32 to the atmosphere and the output 10 of the compressor 6 is connected to the pressurized air vessel 4 via the directional valve 18 and the fourth pressurized air line 26. Thereafter, a control signal is outputted to the compressor 6 so that the compressor 6 starts pumping pressurized air from the input 8 to the output 10, that is, from the atmosphere into the pressurized air vessel 4. If no further pressurized air is to be pumped from the atmosphere into the pressure vessel 4, then a further signal is outputted to the compressor 6 so that the compressor stops running. Furthermore, the control inputs of the controllable directional valves 18 and 34 are no longer supplied with current so that these valves again transfer into the state shown in FIG. 1.

FIG. 2 likewise shows a closed level control system in the form of an air spring arrangement. A first pressure line 12 leads from the pressurized air vessel 4 and can be connected at point 48 to the input line 8 of the compressor 6 via first electrically controllable 2/2 directional valve 36. A second pressurized air line 16 leads from each of the air springs 2a to 2d and is connected to a first input 38 of a changeover valve 40. Therefore, each air spring 2a to 2d can be connected to the output 10 of the compressor 6 via the changeover valve 40.

A third pressurized air line 20 leads from each air spring 2a to 2d and can be connected at point 48 to the input line 8 of the compressor 6 via a second electrically controllable 2/2 directional valve 42. Finally, a fourth pressurized air line 26 goes from the pressurized air vessel 4 and can be connected to the output 10 of the compressor 6 via a second input 44 of the changeover valve 40. The output 10 of the compressor 6 is connected to the output 46 of the changeover valve 40 in order to connect the second pressurized line 16 to the output 10 of the compressor 6 or the fourth pressurized air line 26 to the output 10 depending upon the position of the changeover valve.

In addition to the components already mentioned, the air spring arrangement includes a pressure sensor 30 with the aid of which the air pressure at point 22 can be measured at which the second pressurized air line 16 and the third pressurized air line 20 are connected together. In the following, it will be first explained how, for example, the air pressure in the pressurized air vessel 4 can be measured. First, the first electrically controllable directional valve 36 and the second controllable directional valve 42 are transferred from the base state shown in FIG. 2 into the switching state by applying current to the control inputs thereof. The air pressure in the pressurized air vessel 4 then lies at point 22 via the first pressurized air line 12 and the third pressurized air line 20, which are connected to each other at point 48, and can be measured with the aid of pressure sensor 30.

With respect to air spring 2a, it will be shown by way of example how, with the aid of the pressure sensor 30, the air pressure in one of the air springs 2a to 2d can be measured. First, the controllable directional valve 24a is transferred from the base position shown in FIG. 2 into the switching state by applying current to the control input. The two controllable directional valves 36 and 42 remain in the base position shown in FIG. 2. In this case, the static air pressure in the air spring 2a is present at point 22 and can be measured with the aid of pressure sensor 30. If this has happened, then the control input of the controllable directional valve 24a is no longer supplied with current so that this valve again transfers into the base position shown in FIG. 2.

When a pressure measurement has yielded that the air pressure in the pressurized air vessel 4 is greater than the air pressure in the air spring 2a, then pressurized air can be pumped as follows from the pressurized air vessel 4 into the air spring 2a. First, current is applied to the control inputs of the electrically controllable directional valves (36, 42) and 24a so that these valves are transferred from the base state shown in FIG. 2 into the switching state. The pressurized air vessel 4 is connected via the first pressurized air line 12 and the third pressurized air line 20 to the air spring 2a so that air flows from the pressurized air vessel 4 into the air spring 2a. When the filling operation is to be ended, then the application of current to the control inputs of the directional valves (36, 42, 24a) is interrupted so that they again transfer into the base state shown in FIG. 2. The procedure takes place in the same manner when pressurized air is to be pumped from the air spring 2a into the pressurized air vessel 4 and a pressure measurement with the aid of the pressure sensor 30 yields that the air pressure in the air spring 2a is greater than in the pressurized air vessel 4. In neither case is there a flow through the compressor 6 and it does not have to run.

The air springs 2b to 2d can he pressure compensated or vented correspondingly and only the corresponding directional valves 24b to 24d are to be switched in lieu of the directional valve 24a.

When pressurized air is to be pumped from the pressurized air vessel 4 into the air spring 2a and a pressure measurement with the aid of pressure sensor 30 yields that the air pressure in the pressurized air vessel 4 is less than in the air spring 2, the procedure described below is followed.

First, the control inputs of the first controllable directional valve 36 and of the controllable directional valve 24a are supplied with current so that these valves transfer from the base state shown in FIG. 2 into their switching state. The air pressure in the air spring 2a is greater than the air pressure in the pressurized air vessel 4. For this reason, a larger air pressure lies at the first input 38 of the changeover valve 40 than at the second input 44 of the changeover valve 40. For this reason, the changeover valve 40 assumes the switching state shown in FIG. 2. The pressurized air vessel 4 is then connected to the air spring 2a via the first pressurized air line 12, the compressor 6, via the changeover valve 40 and the second pressurized air line 16. Then, an electric signal is supplied to the compressor 6 so that the compressor begins to pump pressurized air from the input 8 to the output 10 and therefore from the pressurized air vessel 4 into the air spring 2a. If the filling operation of the air spring is to be ended, then current is no longer applied to the control inputs of the valves 36 and 24a so that these valves again transfer into the base state shown in FIG. 2.

In the same way, the air springs 2b to 2d can be filled. In lieu of directional valve 24a, only the corresponding directional valves 24b to 24d are to be switched.

In the following, it will be explained how pressurized air from the air spring 2a can be pumped into the pressurized air vessel 4 when a pressure measurement made with the aid of the pressure sensor 30 yields that the air pressure in the pressurized air vessel 4 is greater than in the air spring 2a. First, a current is applied to the control inputs of the electrically controllable directional valves 24a and 42 so that these valves transfer from the base state, which is shown in FIG. 2, into their switching state. Further, a greater air pressure lies at the second input 44 of the changeover valve 40 than at its first input 38 so that the changeover valve 40 transfers from the state, which is shown in FIG. 2, into the other state thereof. Thereafter, an electrical signal is supplied to the compressor 6 so that the compressor starts to run and pressurized air is pumped from its input 8 to its output 10 and therefore from the air spring 2a into the pressurized air vessel 4. If the discharge operation is to be ended, then the application of current to the control inputs of the directional valves 24a and 42 is interrupted so that these valves again transfer from the switching state into the base state shown in FIG. 2. Furthermore, a signal is outputted to the compressor 6 so that the compressor stops pumping.

In the same way, the air springs 2b to 2d can be filled. In lieu of directional valve 24a, only the corresponding directional valves 24b to 24d are switched.

In addition to the components mentioned above, the air spring arrangement includes an air dryer 32 which, on the one hand, is connected to the atmosphere and, on the other hand, is connected via an electrically controllable 2/2 directional valve 34 to the input 8 of the compressor 6. With the aid of compressor 6, air can be pumped from the atmosphere as follows via the air dryer 32 into the pressurized aid vessel 4. First, current is applied to the control inputs of the electrically controllable directional valves 34 and 42 so that these valves transfer from the base position, which is shown in FIG. 2, into their switching state. The first input 38 of the changeover valve 40 is then connected via the directional valves 42 and 34 and via the air dryer 32 to the atmosphere so that atmospheric pressure is present there. The air pressure in the pressurized air vessel 4 is, in general, greater than the atmospheric pressure. For this reason, the changeover valve 40 transfers from the state shown in FIG. 2 into the other state so that the output 10 of the compressor 6 is connected to the pressurized air vessel 4 via the changeover valve 40 and the fourth pressurized air line 26. Thereafter, a signal is outputted to the compressor 6 so that the compressor pumps pressurized air from the input 8 to the output 10 and therefore from the atmosphere into the vessel 4. If the pumping operation is to be ended, then a signal is applied to the compressor 6 so that the compressor stops. Furthermore, current is no longer applied to the control inputs of the valves 34 and 42 so that these valves transfer again from the switching state into the base state shown in FIG. 2.

FIGS. 1a and 2a show the closed level control system of FIGS. 1 and 2, respectively, equipped with an external pressurized medium reservoir 50. In FIG. 2*a*, an external pressurized medium reservoir 50 is shown and a third controllable directional valve 34 connects the input 8 of pump 6 to the external pressurized medium reservoir. The fourth pressurized medium line 26 is connected to the output 10 of the pump 6 when the supply vessel 4 is filled from the external pressurized medium reservoir 50 by the pump 6.

It is understood that the foregoing description is that of the preferred embodiments of the invention and that various changes and modifications may be made thereto without departing from the spirit and scope of the invention as defined in the appended claims.

What is claimed is:

1. A closed level control system for a vehicle having a vehicle body, vehicle axles and pressurized medium chambers with which the vehicle body is suspended relative to corresponding ones of said vehicle axles, the closed level control system comprising:

a pressurized medium supply vessel for holding a medium under pressure as a pressurized medium;

a pump for transferring said pressurized medium between said supply vessel and said pressurized medium chambers;

said pump having an input and an output and said pump being configured so as to permit said pump to pump said pressurized medium from said input to said output thereof;

a first controllable directional valve;

a second controllable directional valve;

a first pressurized medium line connected to said supply vessel and being connected via said first controllable directional valve to said input of said pump;

a second pressurized medium line connected to said pressurized medium chambers and being connected via said second controllable directional valve to said output of said pump at least when said pressurized medium is to be transferred from said supply vessel into said pressurized medium chambers;

a third pressurized medium line connected to said pressurized medium chambers and being connected via said first controllable directional valve to said input of said pump;

a fourth pressurized medium line connected to said supply vessel and being connected via said second controllable directional valve to said output of said pump at least when pressurized medium is to be transferred by said pump from said pressurized medium chambers into said supply vessel;

a single pressure sensor mounted in said third pressurized medium line;

said single pressure sensor being connectable to said first and fourth pressurized medium lines via said first and second controllable directional valves; and, ancillary valve means switchable between a first position wherein said single pressure sensor is connected to at least one of said pressurized medium chambers for measuring the pressure therein and a second position wherein said single pressure sensor is connected to said pressurized medium supply vessel for measuring the pressure therein.

2. The closed level control system of claim 1, further comprising:

said first and second controllable directional valves each being configured to assume at least first and second switching states;

control means for switching said first and second controllable directional valves into said first switching state to cause said first pressurized medium line to be connected to said input via said first controllable directional valve and said second pressurized medium line to be connected via said second controllable directional valve to said output of said pump thereby facilitating a transfer of said pressurized medium by said pump from said supply vessel and into said pressurized medium chambers; and, said control means functioning to switch said first and second controllable directional valves into said second switching state thereof to cause said third pressurized medium line to be connected via said first controllable directional valve to said input of said pump and said fourth pressurized medium line to be connected via said second controllable directional valve to said output of said pump thereby facilitating the transfer of said pressurized medium by said pump from said pressurized medium chambers into said supply vessel.

3. The closed level control system of claim 1, wherein said controllable directional valves are electrically controllable directional valves.

4. A closed level control system for a vehicle having a vehicle body, vehicle axles and pressurized medium chambers with which the vehicle body is suspended relative to corresponding ones of said vehicle axles, the closed level control system comprising:

a pressurized medium supply vessel for holding a medium under pressure as a pressurized medium;

a pump for transferring said pressurized medium between said supply vessel and said pressurized medium chambers;

said pump having an input and an output and said pump being configured so as to permit said pump to pump said pressurized medium from said input to said output thereof;

a first controllable directional valve switchable between a base state and a switched state;

a second controllable directional valve switchable between a base state and a switched state;

a changeover valve switchable between first and second states;

a first pressurized medium line connected to said supply vessel and being connected via said first controllable directional valve to said input of said pump;

a second pressurized medium line connected to said pressurized medium chambers and being connected via said changeover valve to said output of said pump at least when said pressurized medium is to be transferred by said pump from said supply vessel into said pressurized medium chambers;

control means for switching said first controllable directional valve into said switching state thereof and said changeover valve into said first switching state thereof to cause said first pressurized medium line to be connected to said input via said first controllable directional valve and said second pressurized medium line to be connected to said output of said pump thereby facilitating a transfer of said pressurized medium by said pump from said supply vessel into said pressurized medium chambers;

a third pressurized medium line connected to said pressurized medium chambers and being connected via said second controllable directional valve to said input of said pump;

a fourth pressurized medium line connected to said supply vessel and being connected via said changeover valve to said output of said pump at least when said pressurized medium is to be transferred by said pump from said pressurized medium chambers into said supply vessel;

said control means functioning to switch said second controllable directional valve into said switched state and said changeover valve into said second state thereby facilitating a transfer of said pressurized medium by said pump from said pressurized medium chambers into said supply vessel;

a single pressure sensor mounted in said third pressurized medium line;

said single pressure sensor being connectable to said first and fourth pressurized medium lines via said first and second controllable directional valves; and, ancillary valve means switchable between a first position wherein said single pressure sensor is connected to at least one of said pressurized medium chambers for measuring the pressure therein and a second position wherein said single pressure sensor is connected to said pressurized medium supply vessel for measuring the pressure therein.

5. The closed level control system of claim 4, wherein said first pressurized medium line is connected to said third pressurized medium line when said first and second controllable directional valves are simultaneously in the switched state thereof.

6. The closed level control system of claim 4, wherein said pressurized medium supply vessel is a first pressurized medium supply vessel; and, said closed level control system further comprising:

a second pressurized medium supply vessel;

a third controllable directional valve for connecting said input of said pump to said second pressurized medium supply vessel; and, means for connecting said fourth pressurized medium line to said output of said pump when said first pressurized medium supply vessel is filled from said second pressurized medium vessel by said pump.

7. The closed level control system of claim 4, wherein said controllable directional valves are electrically controllable directional valves.

8. A closed level control system for a vehicle having a vehicle body, vehicle axles and pressurized medium chambers with which the vehicle body is suspended relative to corresponding ones of said vehicle axles, the closed level control system comprising:

a pressurized medium supply vessel for holding a medium under pressure as a pressurized medium;

a pump for transferring said pressurized medium between said supply vessel and said pressurized medium chambers;

said pump having an input and an output and said pump being configured so as to permit said pump to pump said pressurized medium from said input to said output thereof;

a first controllable directional valve switchable between a base state and a switched state;

a second controllable directional valve switchable between a base state and a switched state;

a changeover valve switchable between first and second states;

a first pressurized medium line connected to said supply vessel and being connected via said first controllable directional valve to said input of said pump;

a second pressurized medium line connected to said pressurized medium chambers and being connected via said changeover valve to said output of said pump at least when said pressurized medium is to be transferred by said pump from said supply vessel into said pressurized medium chambers;

control means for switching said first controllable directional valve into said switching state thereof and said changeover valve into said first switching state thereof to cause said first pressurized medium line to be connected to said input via said first controllable directional valve and said second pressurized medium line to be connected to said output of said pump thereby facilitating a transfer of said pressurized medium by said pump from said supply vessel into said pressurized medium chambers;

a third pressurized medium line connected to said pressurized medium chambers and being connected via said second controllable directional valve to said input of said pump;

a fourth pressurized medium line connected to said supply vessel and being connected via said changeover valve to said output of said pump at least when said pressurized medium is to be transferred by said pump from said pressurized medium chambers into said supply vessel;

said control means functioning to switch said second controllable directional valve into said switched state and said changeover valve into said second state thereby facilitating a transfer of said pressurized medium by said pump from said pressurized medium chambers into said supply vessel;

a pressure sensor mounted in one of said second and third pressurized medium lines; and, a third controllable directional valve connected between said pressure sensor and said pressurized medium chambers and being switchable between a base state wherein said pressurized medium chambers are separated from said pressure sensor and a switched state wherein said pressurized medium chambers are connected to said pressure sensor.

* * * * *